(12) United States Patent
De Foy et al.

(10) Patent No.: US 9,119,115 B2
(45) Date of Patent: Aug. 25, 2015

(54) INTER-USER EQUIPMENT (UE) TRANSFER (IUT) FOR COLLABORATIVE SESSIONS THAT INCLUDE MEDIA SESSION INFORMATION

(75) Inventors: Xavier De Foy, Kirkland (CA); Osama Lotfallah, King of Prussia, PA (US); Milan Patel, Middlesex (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 348 days.

(21) Appl. No.: 13/251,560

(22) Filed: Oct. 3, 2011

(65) Prior Publication Data

US 2012/0084361 A1 Apr. 5, 2012

Related U.S. Application Data

(60) Provisional application No. 61/389,576, filed on Oct. 4, 2010.

(51) Int. Cl.
| | |
|---|---|
| *G06F 15/16* | (2006.01) |
| *H04W 36/00* | (2009.01) |
| *H04L 12/18* | (2006.01) |
| *H04L 29/06* | (2006.01) |
| *H04L 29/08* | (2006.01) |

(52) U.S. Cl.
CPC ....... *H04W 36/0022* (2013.01); *H04L 12/1813* (2013.01); *H04L 12/1822* (2013.01); *H04L 29/06326* (2013.01); *H04L 29/08585* (2013.01); *H04L 65/1086* (2013.01)

(58) Field of Classification Search
CPC ............ H04L 12/1813; H04L 12/1822; H04L 29/06326; H04L 29/08585
USPC ............... 709/227, 206, 228, 204; 455/414.3, 455/414.1; 370/331, 352; 705/30; 726/2; 715/741
See application file for complete search history.

(56) References Cited

U.S. PATENT DOCUMENTS

| | | | |
|---|---|---|---|
| 2007/0044026 A1* | 2/2007 | Potter et al. | 715/741 |
| 2009/0313378 A1* | 12/2009 | Mahdi et al. | 709/227 |
| 2010/0254370 A1* | 10/2010 | Jana et al. | 370/352 |
| 2010/0279670 A1* | 11/2010 | Ghai et al. | 455/414.3 |
| 2010/0312841 A1* | 12/2010 | Doken et al. | 709/206 |
| 2010/0312897 A1* | 12/2010 | Allen et al. | 709/227 |
| 2011/0053571 A1* | 3/2011 | Mahdi et al. | 455/414.1 |
| 2011/0231560 A1* | 9/2011 | Mahendran et al. | 709/228 |
| 2012/0011257 A1* | 1/2012 | Kim et al. | 709/227 |
| 2012/0063414 A1* | 3/2012 | Ramachandran | 370/331 |

(Continued)

OTHER PUBLICATIONS

Interdigital Communications, "Informing New Controller of Session Information," TD S2-104838, 3GPP TSG WG2 Meeting #81, Prague, Czech Republic, Oct. 11-15, 2010.

(Continued)

*Primary Examiner* — Le H Luu
(74) *Attorney, Agent, or Firm* — Volpe and Koenig, P.C.

(57) ABSTRACT

A method and apparatus for inter-user equipment (UE) transfer (IUT) of collaborative session control and session information between WTRUs. A collaborative session control transfer request including ongoing session information is transmitted prior to transfer of session control from one WTRU to another WTRU. Ongoing session information may include information regarding media flows and devices involved in the session. A media control transfer response is transmitted in response to the transfer request.

10 Claims, 9 Drawing Sheets

(56) References Cited

U.S. PATENT DOCUMENTS

| | | | | |
|---|---|---|---|---|
| 2012/0072504 | A1* | 3/2012 | Kowalewski | 709/206 |
| 2012/0084361 | A1* | 4/2012 | De Foy et al. | 709/204 |
| 2012/0102209 | A1* | 4/2012 | Fok Ah Chuen et al. | 709/228 |
| 2012/0197770 | A1* | 8/2012 | Raheja et al. | 705/30 |
| 2012/0227084 | A1* | 9/2012 | Shen | 726/2 |

OTHER PUBLICATIONS

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v6.0, Sep. 2010.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.10.0, Sep. 2011.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.4.0, Sep. 2010.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.8.0, Sep. 2011.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.0.0, Sep. 2010.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.4.0, Sep. 2011.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 11)," 3GPP TS 24.237 v11.0.0, Sep. 2011.

Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v10.0.0, Sep. 2010.

Third Generation Partnership Project, "Technical Specification Group Services and System Aspects; IP Multimedia Subsystem (IMS) Service Continuity; Stage 2 (Release 8)," 3GPP TS 23.237 v8.7.0, Mar. 2010.

Third Generation Partnership Project, "Technical Specification Group Services and System Aspects; IP Multimedia Subsystem (IMS) Service Continuity; Stage 2 (Release 9)," 3GPP TS 23.237 v9.6.0, Sep. 2010.

Third Generation Partnership Project, "Technical Specification Group Services and System Aspects; IP Multimedia Subsystem (IMS) Service Continuity; Stage 2 (Release 9)," 3GPP TS 23.237 v9.8.0, Mar. 2011.

Third Generation Partnership Project, "Technical Specification Group Services and System Aspects; IP Multimedia Subsystem (IMS) Service Continuity; Stage 2 (Release 10)," 3GPP TS 23.237 v10.3.0, Sep. 2010.

Third Generation Partnership Project, "Technical Specification Group Services and System Aspects; IP Multimedia Subsystem (IMS) Service Continuity; Stage 2 (Release 10)," 3GPP TS 23.237 v10.7.0, Sep. 2011.

Third Generation Partnership Project, "Technical Specification Group Services and System Aspects; IP Multimedia Subsystem (IMS) Service Continuity; Stage 2 (Release 11)," 3GPP TS 23.237 v11.2.0, Sep. 2011.

Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 0.3.0 (Aug. 2010).

Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 V10.0.0 (Mar. 2011).

Interdigital Communications, "Informing New Controller of Session Information," TD S2-104838, 3GPP TSG SA WG2 Meeting #81, Prague, Czech Republic, Oct. 11-15, 2010.

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.6.0, Sep. 2010.

Third Generation Partnership Project, "Technical Specification Group Services and System Aspects; IP Mulitmedia Subsystem (IMS) Service Continuity; Inter-UE Transfer Enhancements; Stage 2 (Release 10)," 3GPP TR 23.831 v10.0.0, Sep. 2010.

Interdigital Communications, "Option 2: Session information is sent by SCC AS to target Controller UE in Collaborative Session Control transfer request," 3GPP TSG SA WG2 Meeting #81, S2-104840, Prague, Czech Republic, Oct. 11-15, 2010.

Interdigital Communications, "Corrections to IUT media flow replication by network subclauses," 3GPP TSG SA WG2 Meeting #81, Czech Republic, S2-104970 (Oct. 11-15, 2010).

Interdigital Communications, "Option 2: Session information is sent by SCC AS to target Controller UE in Collaborative Session Control transfer request," 3GPP TSG SA WG2 Meeting #81, Czech Republic, S2-104971 (Oct. 11-15, 2010).

LG Electronics et al., "IUT: Adding descriptions related to the roles of Controller UE and Controllee UE," 3GPP TSG SA WG2 Meeting #81, Prague, Czech Republic, S2-104972 (Oct. 11-15, 2010).

LG Electronics et al., "IUT: Transfer of Collaborative Session Control initiated by the target UE," 3GPP TSG SA WG2 Meeting #81, Prague, Czech Republic, S2-104973 (Oct. 11-15, 2010).

LG Electronics, "IUT: Restructuring and Clarifying subclause for Controller UE initiated modify media," 3GPP TSG SA WG2 Meeting #81, Prague, Czech Republic, S2-104871 (Oct. 11-15, 2010).

SA WG2, "5 CRs to 23.237 (IMS_SC_eIDT, Rel 10)," TSG SA Meeting #50, Istanbul, Turkey, SP-100682 (Dec. 13-15, 2010).

Third Generation Partnership Project, "Technical Specification Group Core Network and Terminals; IP Multimedia (IM) Core Network (CN) subsystem IP Multimedia Subsystem (IMS) inter-UE transfer; Stage 3 (Release 10)," 3GPP TS 24.337 V10.2.0 (Sep. 2011).

* cited by examiner

INTER-USER EQUIPMENT (UE) TRANSFER (IUT) FOR COLLABORATIVE SESSIONS THAT INCLUDE MEDIA SESSION INFORMATION

CROSS REFERENCE TO RELATED APPLICATIONS

This application claims the benefit of U.S. Provisional Application No. 61/389,576 filed on Oct. 4, 2010, the contents of which are hereby incorporated by reference herein.

BACKGROUND

The Internet Protocol (IP) Multimedia Subsystem (IMS) is an architectural framework for delivering IP-based multimedia services. A wireless transmit/receive unit (WTRU) may connect to an IMS through various access networks, including but not limited to networks based on technology such as Universal Mobile Telecommunication System (UMTS) Terrestrial Radio Access Network (UTRAN), Long Term Evolution (LTE), Worldwide Interoperability for Microwave Access (WiMax), or Wireless Local Area Network (WLAN) technology. Some procedures available through the use of IMS are the transfer, modification, replication and retrieval of media sessions between IMS-capable WTRUs in real-time. These procedures are known as Inter-User Equipment Transfer (IUT) or Inter-Device Transfer (IDT).

Media sessions may be shared by multiple devices that are part of a collaborative session. Within a collaborative session one device may be the controller of the session while other devices are controlees. Transfer of control from the controller to one of the controlees may occur. When session control is transferred, the new controller may not be aware of the entire collaborative session. Accordingly, it would be advantageous for information relating to the entire collaborative session be available prior to or at the time of transfer of control of a media session.

SUMMARY

A method and apparatus for inter-user equipment (UE) transfer (IUT) of collaborative session control and session information between WTRUs. A collaborative session control transfer request including ongoing session information is transmitted prior to transfer of session control from one WTRU to another WTRU. Ongoing session information may include information regarding media flows and devices involved in the session. A media control transfer response is transmitted in response to the transfer request.

BRIEF DESCRIPTION OF THE DRAWINGS

A more detailed understanding may be had from the following description, given by way of example in conjunction with the accompanying drawings wherein.

DETAILED DESCRIPTION

Figure 1A:
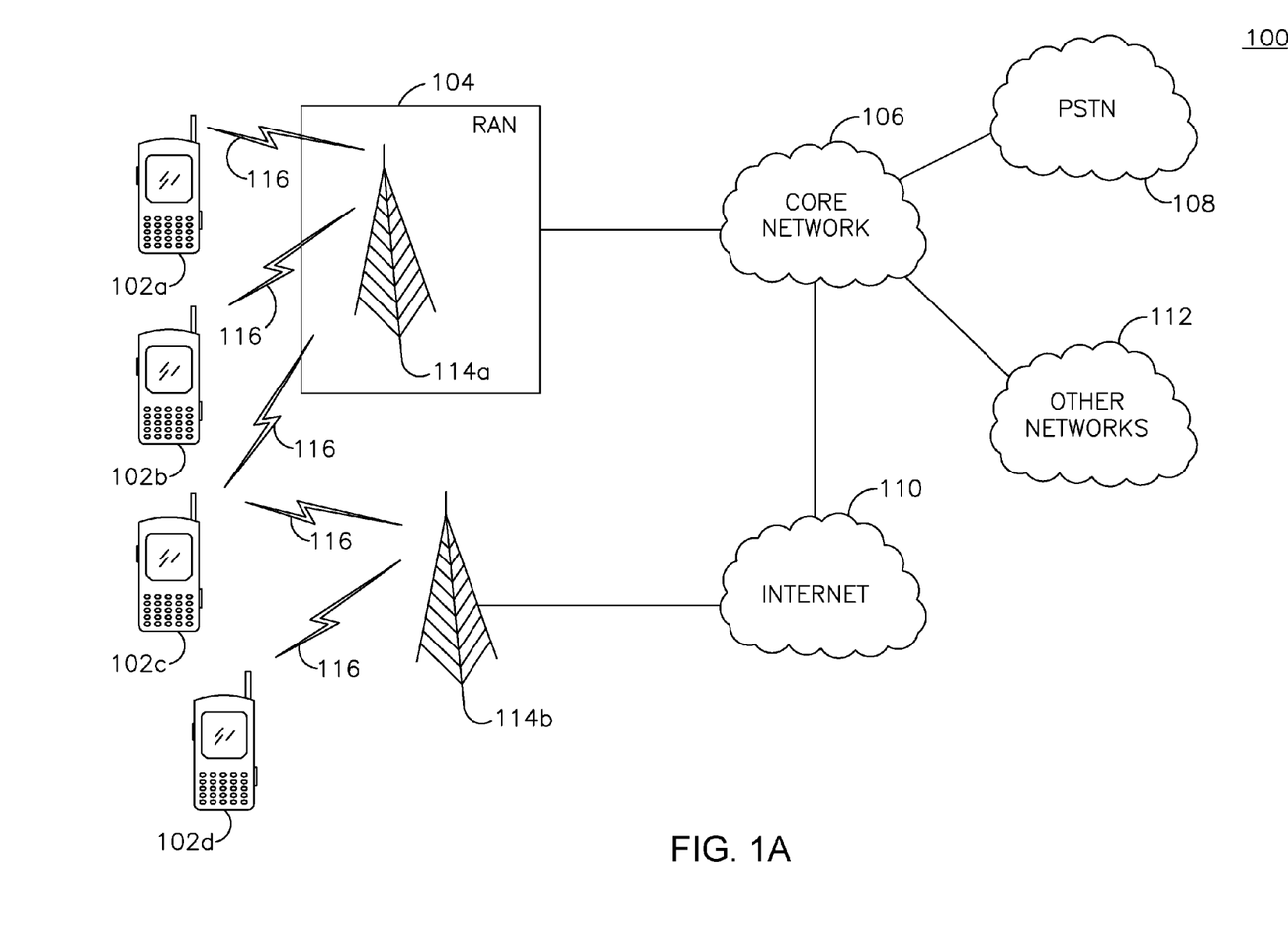
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
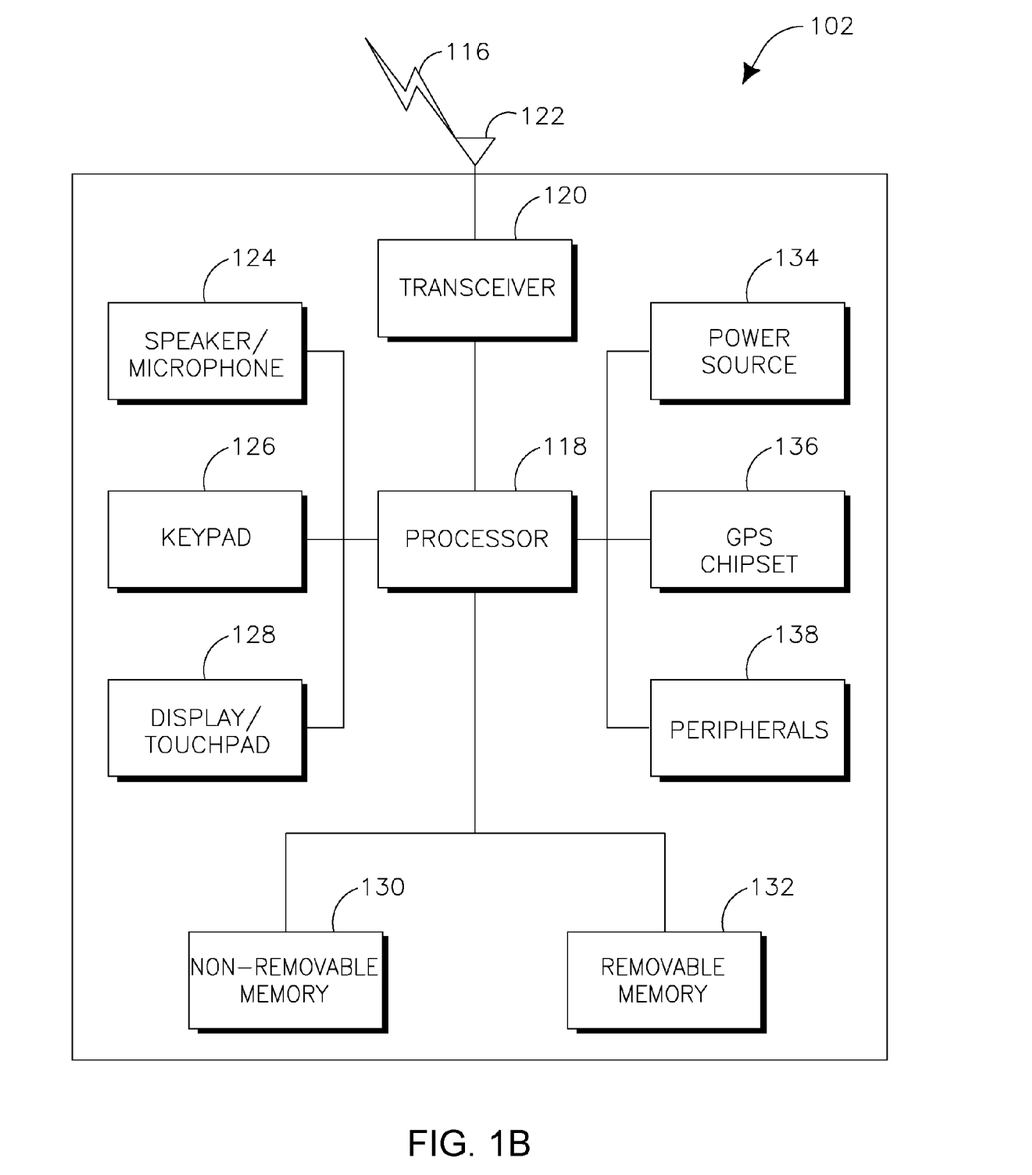
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
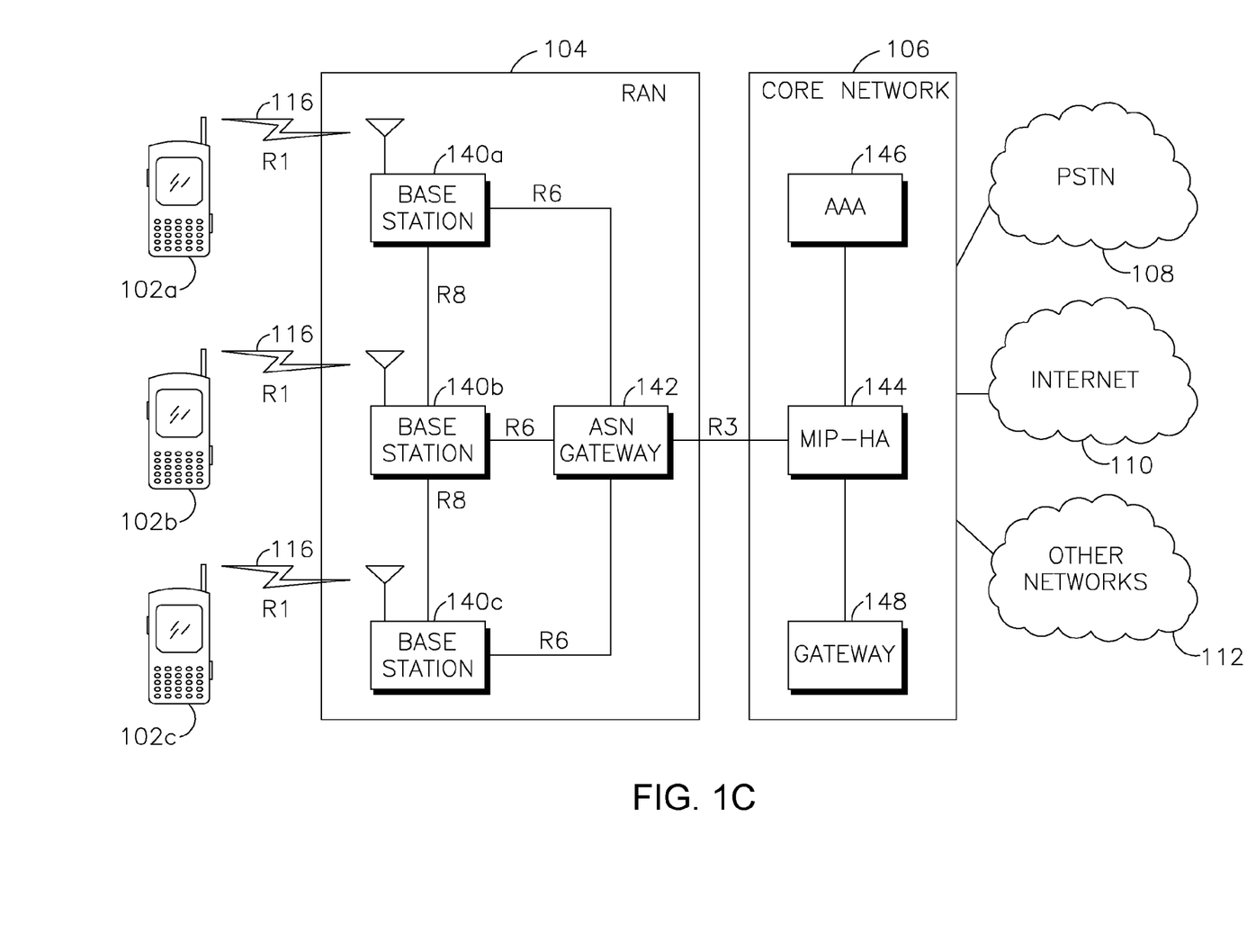
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 2:
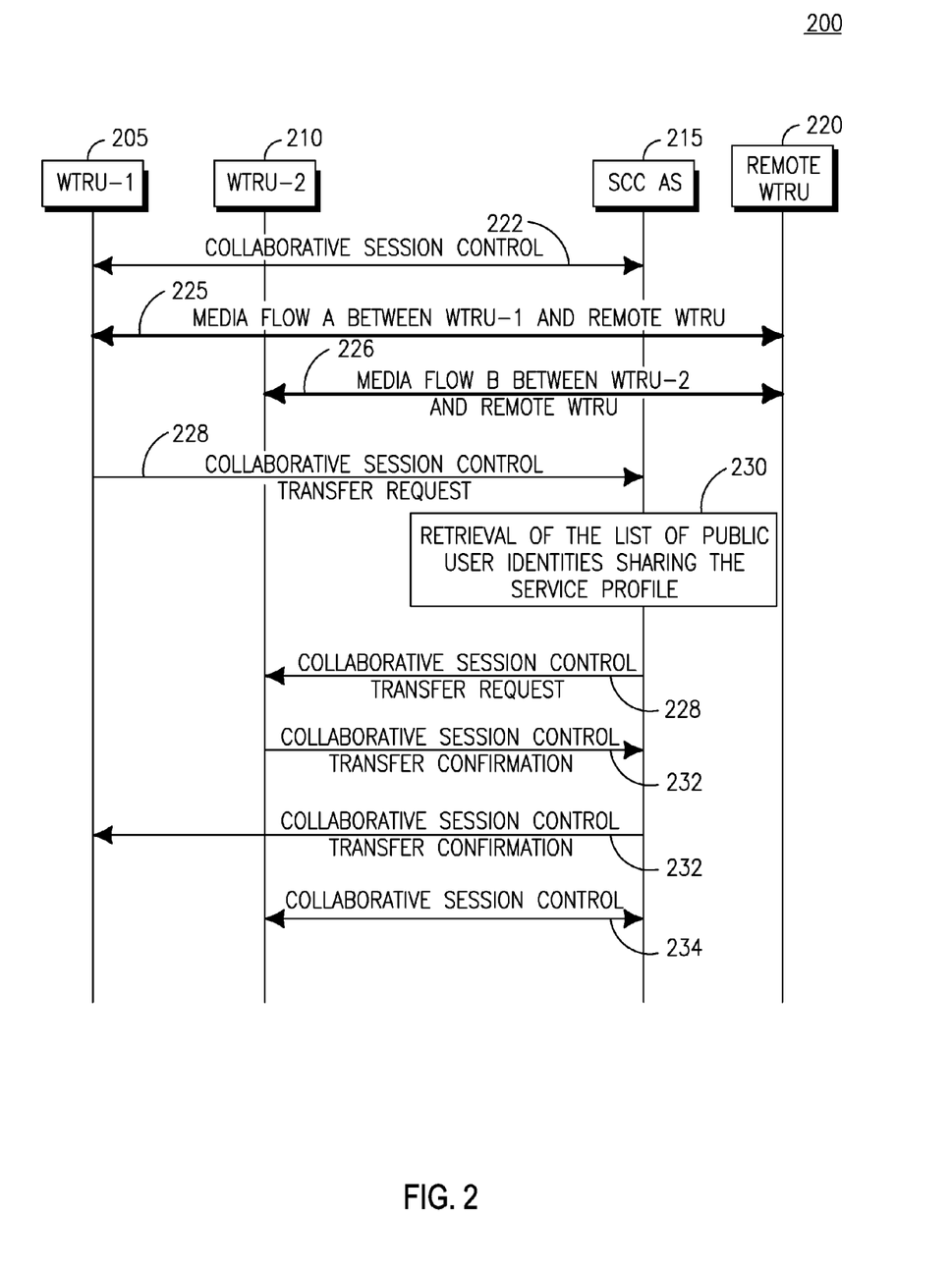
FIG. 2 is a flow diagram of an example of controller initiated transfer of collaborative session control.

FIG. 2 is a flow diagram 200 of an example of controller initiated transfer of collaborative session control. A collaborative session is a set of two or more Access Legs and related media on two or more WTRUs that are presented as one Remote Leg by the SCC AS. All or part of the session may be transferred or replicated. The device that originates the session may be the controller of the session. Devices, other than the controller, participating in the collaborative session, are the controlees of the session. Control may be transferred from the controller to a controlee during a collaborative session control transfer. Once the collaborative session control transfer occurs, session discovery may be performed by the new controller in order to determine session information and information regarding media flows.

WTRU-1 205 and WTRU-2 210 may be involved in a collaborative session with a Remote WTRU 220. The controller WTRU, WTRU-1 205, establishes control of the collaborative session 222 via the SCC AS 215. The collaborative session may include multiple media flows and may be anchored at the SCC AS 215. Media flow A 225 may occur between WTRU-1 205 and the Remote WTRU 220. Media flow B 226 may occur between WTRU-2 210 and the Remote WTRU 220. WTRU-1 205 may transfer control of the collaborative session by sending a collaborative session control transfer request 228 to the SCC AS 215. The collaborative session control transfer request 228 may include a registered public user identity of WTRU-2 210.

WTRU-2 may register one or more user identities, the identities may be used to identify a user of WTRU-2 and may be used by other devices to target requests towards WTRU-2. The registered public user identity may be used to identify the target of the collaborative session control transfer request. The media flows to WTRU-1 205 and WTRU-2 210 from the Remote WTRU 220 may remain unaffected.

The SCC AS 215 may not have a list of all registered public user identities that share the service profile with the public user identity used by WTRU-1 205 for the collaborative session. The SCC AS 215 may retrieve a list of all of the registered public user identities 230 sharing the same public service profile and the identity registered by WTRU-1 205. The service profile defines a set of service triggers which are applicable to a set of public user identities. The public service profile may include but is not limited to: public identification, core network service authorization and initial filter criteria.

The SCC AS 215 determines whether WTRU-2 210 is able to act as a controller for the collaborative session and that the registered public user identity used by WTRU-2 210 shares the service profile with the public user identity used by WTRU-1 205 for the collaborative session. The SCC AS 215 transfers the collaborative session control transfer request 228 to WTRU-2 210. WTRU-2 210 determines whether to accept the control transfer request and upon a determination to accept the request, WTRU-2 210 transmits a collaborative session control transfer confirmation 232 to WTRU-1 205 via the SCC AS 215. The SCC AS 215 may remove collaborative session control from WTRU-1 205. WTRU-2 210 establishes control of the collaborative session 234 via the SCC AS 215. WTRU-2 210 is the controller of the session while WTRU-1 205 is a controlee of the session.

At any point in the method of FIG. 2, additional actions may be performed between WTRU-1 205, WTRU-2 210, the SCC AS 215 and the Remote WTRU 220.

Figure 3:
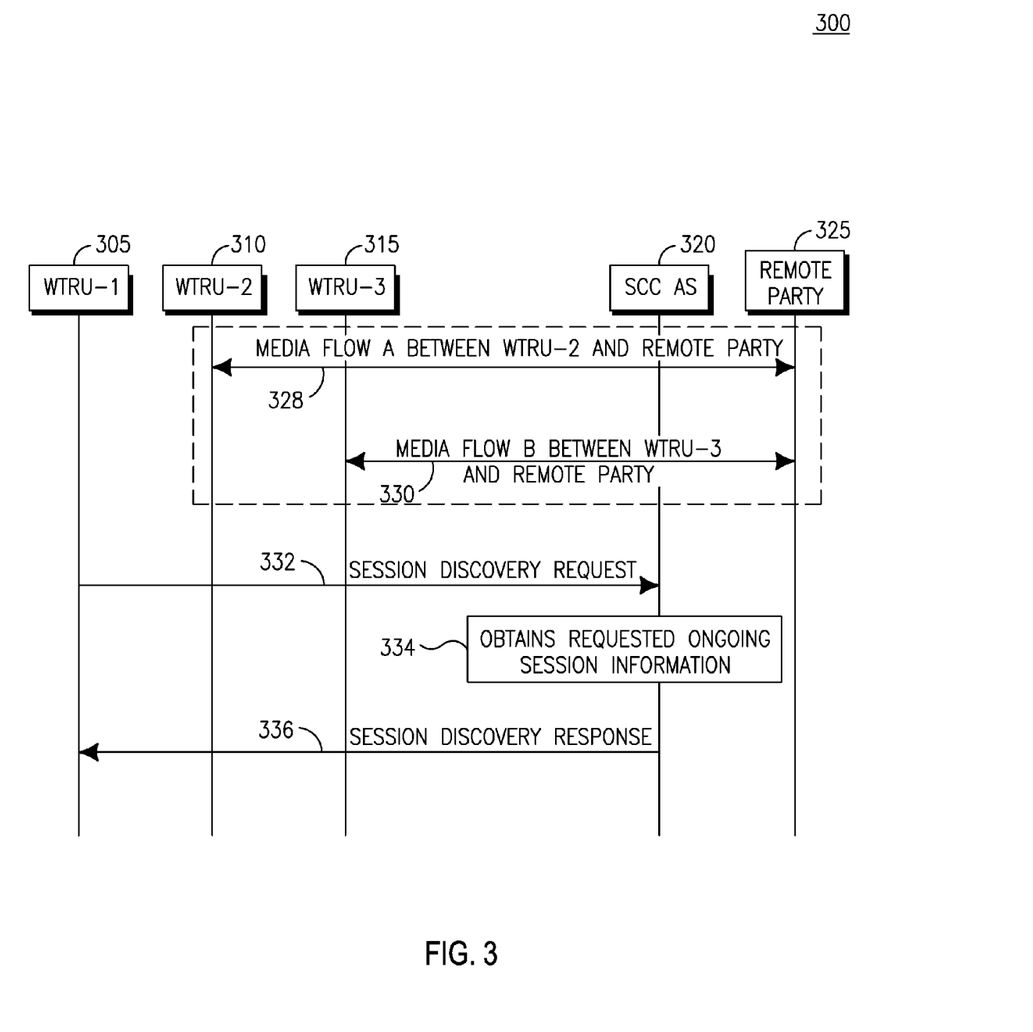
FIG. 3 is a flow diagram of an example of session discovery.

FIG. 3 is a flow diagram 300 of an example of discovery of session information by a WTRU that is part of an IMS subscription. A collaborative session may be established and may include multiple media flows. WTRU-2 310 and WTRU-3 315 may be involved in a collaborative session with a Remote WTRU 325. Media flow A 328 may occur between WTRU-2 310 and the Remote WTRU 325. Media flow B 330 may occur between WTRU-3 315 and the Remote WTRU 325. WTRU-1 305, which is part of the same IMS subscription as WTRU-2 310 and WTRU-3 315, may transmit a session discovery request 332 to the SCC AS 320 to determine session information for the ongoing collaborative session. The SCC AS 320 obtains the requested session information 334 and transmits a session discovery response 336 to WTRU-1 305.

Session discovery may allow a device to gain additional information such as the identities of devices involved in a collaborative session as well as the type of media that the session includes. An identifier of the SCC AS, an indication of the type of request or an identifier of the collaborative session may be included in a session discovery request. Identities of the devices involved in the collaborative session and the type of media that the session includes may be included in a session discovery response.

At any point in the method of FIG. 3, additional actions may be performed between WTRU-1 305, WTRU-2 310, WTRU-3 315 the SCC AS 320 and the Remote WTRU 336.

Figure 4:
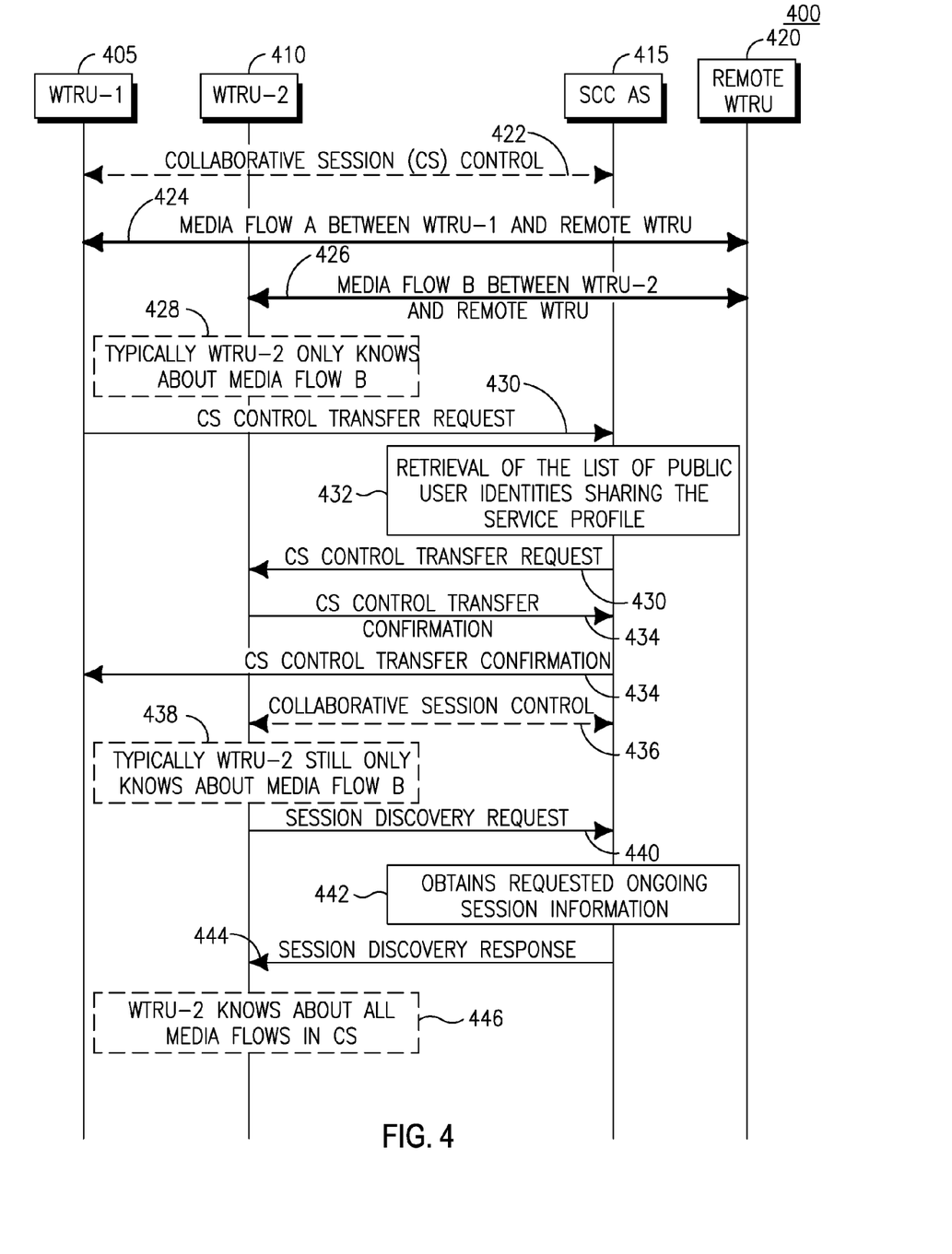
FIG. 4 is a flow diagram of an example of controller initiated transfer of collaborative session control followed by session discovery.

FIG. 4 is a flow diagram 400 of an example of controller initiated transfer of collaborative session control followed by session discovery. WTRU-1 405, as the controller, transfers control of the collaborative session to WTRU-2 410. WTRU-2 410, as the new controller, performs session discovery.

WTRU-1 405 and WTRU-2 402 may be involved in a collaborative session with a Remote WTRU 415. The controller WTRU, WTRU-1 405, establishes control of the collaborative session 422 via the SCC AS 415. The collaborative session may include multiple media flows and may be anchored at the SCC AS 415. Media flow A 424 may occur between WTRU-1 405 and the Remote WTRU 420. Media flow B 426 may occur between WTRU-2 410 and the Remote WTRU 420. While WTRU-1 405, the current controller, is aware of session information and media flows for the entire collaborative session, generally, WTRU-2 410 may only be aware of session information regarding media flow B 428. The entire collaborative session includes all media flows information regarding media flows and session information.

WTRU-1 405 may transfer control of the collaborative session by sending a collaborative session control transfer request 430 to the SCC AS 415. The collaborative session control transfer request 430 may include a registered public user identity of WTRU-2 410. The media flows to WTRU-1 405 and WTRU-2 410 from the Remote WTRU 420 may remain unaffected.

The SCC AS 415 may retrieve a list 432 of all of the public user identities sharing a WTRU-1's 405 public service profile. The SCC AS 415 determines whether WTRU-2 410 is able to act as a controller for the collaborative session and that the registered public user identity used by WTRU-2 410 shares the service profile with the public user identity used by WTRU-1 405 for the collaborative session. The SCC AS 415 transfers the collaborative session control transfer request 430 to WTRU-2 410. WTRU-2 410 determines whether to accept the control transfer request and upon a determination to accept the request, WTRU-2 410 transmits a collaborative session control transfer confirmation 434 to WTRU-1 405 via the SCC AS 415.

WTRU-2 410 establishes control of the collaborative session 436 via the SCC AS 415. The SCC AS 415 may remove collaborative session control from WTRU-1 405. WTRU-2 410 is the controller of the session while WTRU-1 405 is a controlee of the session. Even after transfer of control of the collaborative session to WTRU-2 410, WTRU-2 410 is only aware of session information regarding media flow B 438. In order to determine the status of the entire session, WTRU-2 410 performs a session discovery request 440.

WTRU-2 410 may transmit a session discovery request 440 to the SCC AS 415 to determine session information for the ongoing collaborative session. The SCC AS 415 obtains the requested session information 442 and transmits a session discovery response 444 including the session information to WTRU-2 410. Upon receipt of the session discovery response 444, WTRU-2 410 is aware of all media flows and session information for the collaborative session 446.

At any point in the method of FIG. 4, additional actions may be performed between WTRU-1 405, WTRU-2 410, the SCC AS 415 and the Remote WTRU 420.

Figure 5:
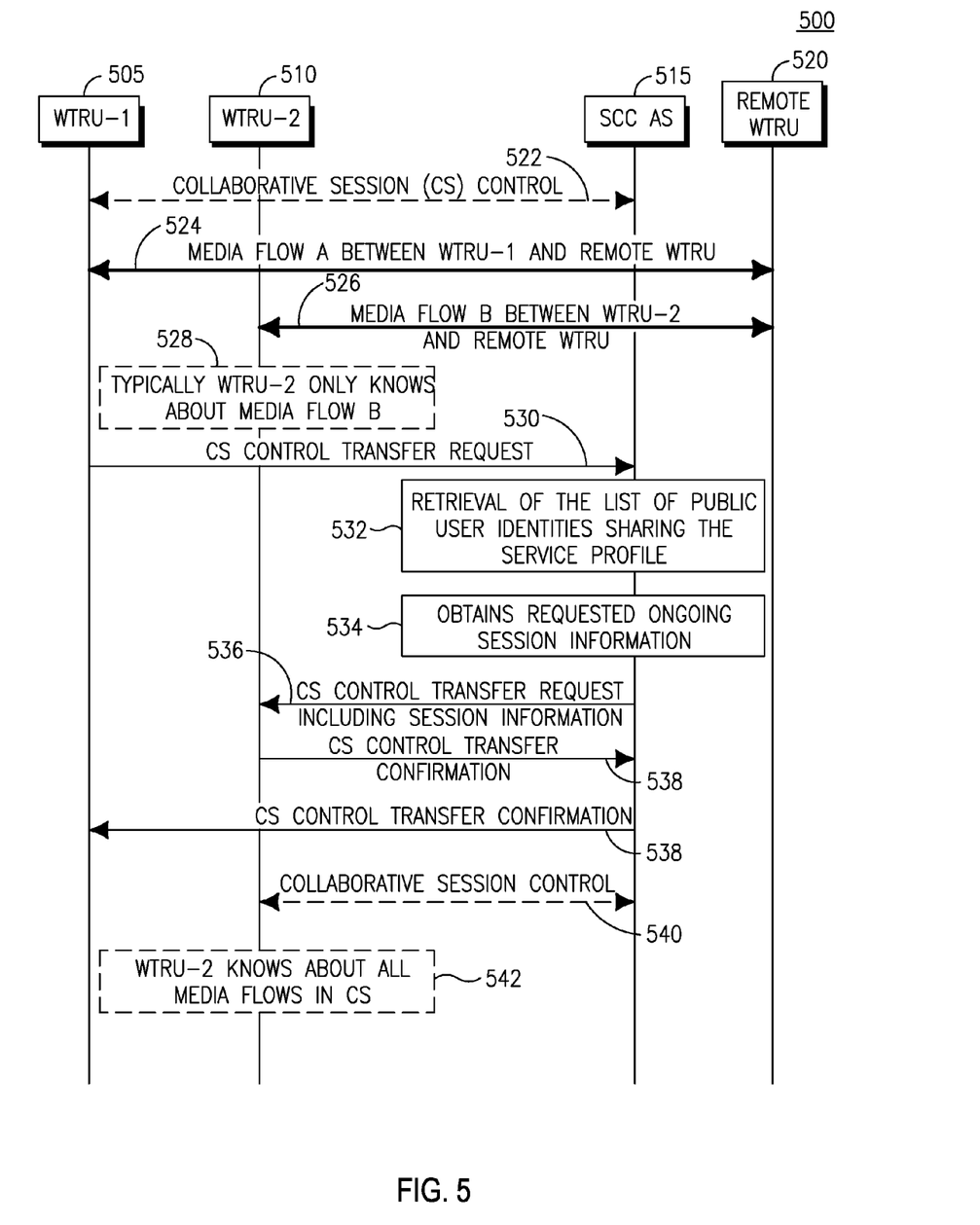
FIG. 5 is a flow diagram of an example of controller initiated transfer of collaborative session control including session discovery information.

FIG. 5 is a flow diagram 500 of an example of controller initiated transfer of collaborative session control including session discovery information. A controller WTRU may transfer control of a collaborative session to another WTRU within the collaborative session. The new controller may be unaware of all media flows and information for the entire collaborative session and is only aware of information and media flows with which it is associated. For example, the new controller may not be aware of where the media currently resides, the status of the media or other devices involved in the collaborative session.

Generally, the new controller, after receiving control, transmits a session discovery request to obtain session information and media flows for the entire collaborative session. By separating the transfer of collaborative session control from session discovery into two different procedures, system optimization and error management may be difficult. For example, a collaborative session control transfer may be successful while a session discovery procedure fails. This may leave the new controller in a state where it is unaware of ongoing media sessions.

In this embodiment, the new controller receives the session and media flow information from the SCC AS 515 with the initial collaborative session transfer request. By combining the control of the collaborative session with session discovery, the new controller is aware of session information and media flows for the entire collaborative session prior to receiving any requests that would require such knowledge.

WTRU-1 505 and WTRU-2 510 may be involved in a collaborative session with a Remote WTRU 520. The controller WTRU, WTRU-1 505, establishes control of the collaborative session 522 via the SCC AS 515. The collaborative session may include multiple media flows and may be anchored at the SCC AS 515. Media flow A 524 may occur between WTRU-1 505 and the Remote WTRU 520. Media flow B 526 may occur between WTRU-2 5100 and the Remote WTRU 520. Generally, WTRU-2 510 may only be aware of session information regarding media flow B 528 while WTRU-1 505 is aware of session information and media flows for the entire collaborative session.

WTRU-1 505 may transfer control of the collaborative session by sending a collaborative session control transfer request 530 to the SCC AS 515. The collaborative session control transfer request 530 may include a registered public user identity of WTRU-2 510. The SCC AS 515 may retrieve a list 532 of all of the registered public user identities sharing WTRU-1's 505 public service profile. In addition, the SCC AS 515 obtains ongoing session information 534 for the collaborative session.

The SCC AS 515 determines whether WTRU-2 510 may act as a controller for the collaborative session and that the registered public user identity used by WTRU-2 510 shares the service profile with the public user identity used by WTRU-1 505 for the collaborative session. The SCC AS 515 transfers the collaborative session control transfer request 536 including session information to WTRU-2 510, requesting WTRU-2 510 to assume the role of controller WTRU for the collaborative session.

WTRU-2 510 determines whether to accept the control transfer request 536 and upon a determination to accept the request 536, WTRU-2 510 transmits a collaborative session control transfer confirmation 538 to WTRU-1 505 via the SCC AS 515. WTRU-2 510 establishes control of the collaborative session 540 via the SCC AS 515. The SCC AS 515 may remove collaborative session control from WTRU-1 505. WTRU-2 510 is the controller of the session while WTRU-1 505 is a controlee of the session. WTRU-2 510 is aware of all media flows and session information 542 for the collaborative session.

At any point in the method of FIG. 5, additional actions may be performed between WTRU-1 505, WTRU-2 510, the SCC AS 515 and the Remote WTRU 520.

Figure 6:
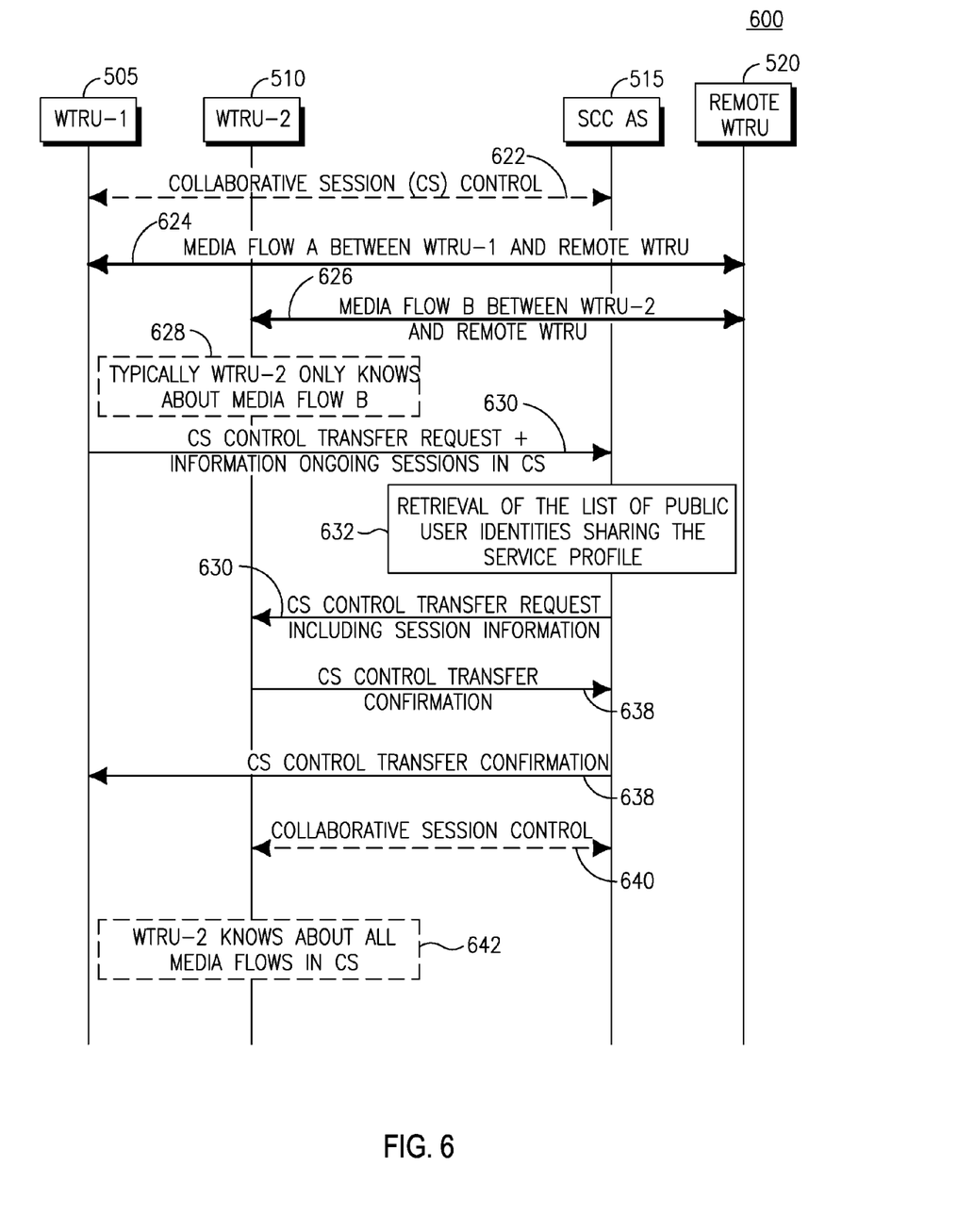
FIG. 6 is a flow diagram of an alternative embodiment of controller initiated transfer of collaborative session control including session discovery information.

FIG. 6 is a flow diagram 600 of an alternative embodiment of controller initiated transfer of collaborative session control including session discovery information. A controller WTRU may transfer control of a collaborative session to another WTRU within the collaborative session. While the new controller may be unaware of all media flows and information for the entire collaborative session, the controller WTRU that is transferring control is aware of session information and media flows for the entire collaborative session. Generally, the new controller, after receiving control, transmits a session discovery request to obtain session information and media flows for the entire collaborative session. In this embodiment, the controller WTRU determines to transfer control using a collaborative session transfer request that includes ongoing session and media information.

WTRU-1 505 and WTRU-2 510 may be involved in a collaborative session with a Remote WTRU 520. The controller WTRU, WTRU-1 505, establishes control 622 of the collaborative session via the SCC AS 515. The collaborative session may include multiple media flows and may be anchored at the SCC AS 515. Media flow A 624 may occur between WTRU-1 505 and the Remote WTRU 520. Media flow B 626 may occur between WTRU-2 510 and the Remote WTRU 520. Generally, WTRU-2 510 may only be aware of session information regarding media flow B 628 while WTRU-1 505 is aware of session information and media flows for the entire collaborative session.

WTRU-1 505 may transfer control of the collaborative session by sending a collaborative session control transfer request 630 to the SCC AS 515. The collaborative session control transfer request 630 transmitted to the SCC AS 515 includes session information and media flows for the entire collaborative session. The collaborative session control transfer request 630 may also include a registered public user identity of WTRU-2 510.

The SCC AS 515 may retrieve a list of all of the registered public user identities 632 sharing WTRU-1's 505 public service profile. The SCC AS 515 determines whether WTRU-2 510 may act as a controller for the collaborative session and that the registered public user identity used by WTRU-2 510 shares the service profile with the public user identity used by WTRU-1 505 for the collaborative session. The SCC AS 515 transfers the collaborative session control transfer request 630, requesting WTRU-2 510 to assume the role of controller WTRU for the collaborative session, and the ongoing session information to WTRU-2 510.

WTRU-2 510 determines whether to accept the control transfer request and upon a determination to accept the request, WTRU-2 510 transmits a collaborative session control transfer confirmation 638 to WTRU-1 505 via the SCC AS 515. WTRU-2 510 establishes control of the collaborative session 640 via the SCC AS 515. WTRU-2 510 is the controller of the session while WTRU-1 505 is a controlee of the session. WTRU-2 510 is aware of all media flows and session information 642 for the collaborative session.

At any point in the method of FIG. 6, additional actions may be performed between WTRU-1 505, WTRU-2 510, the SCC AS 515 and the Remote WTRU 520.

Figure 7:
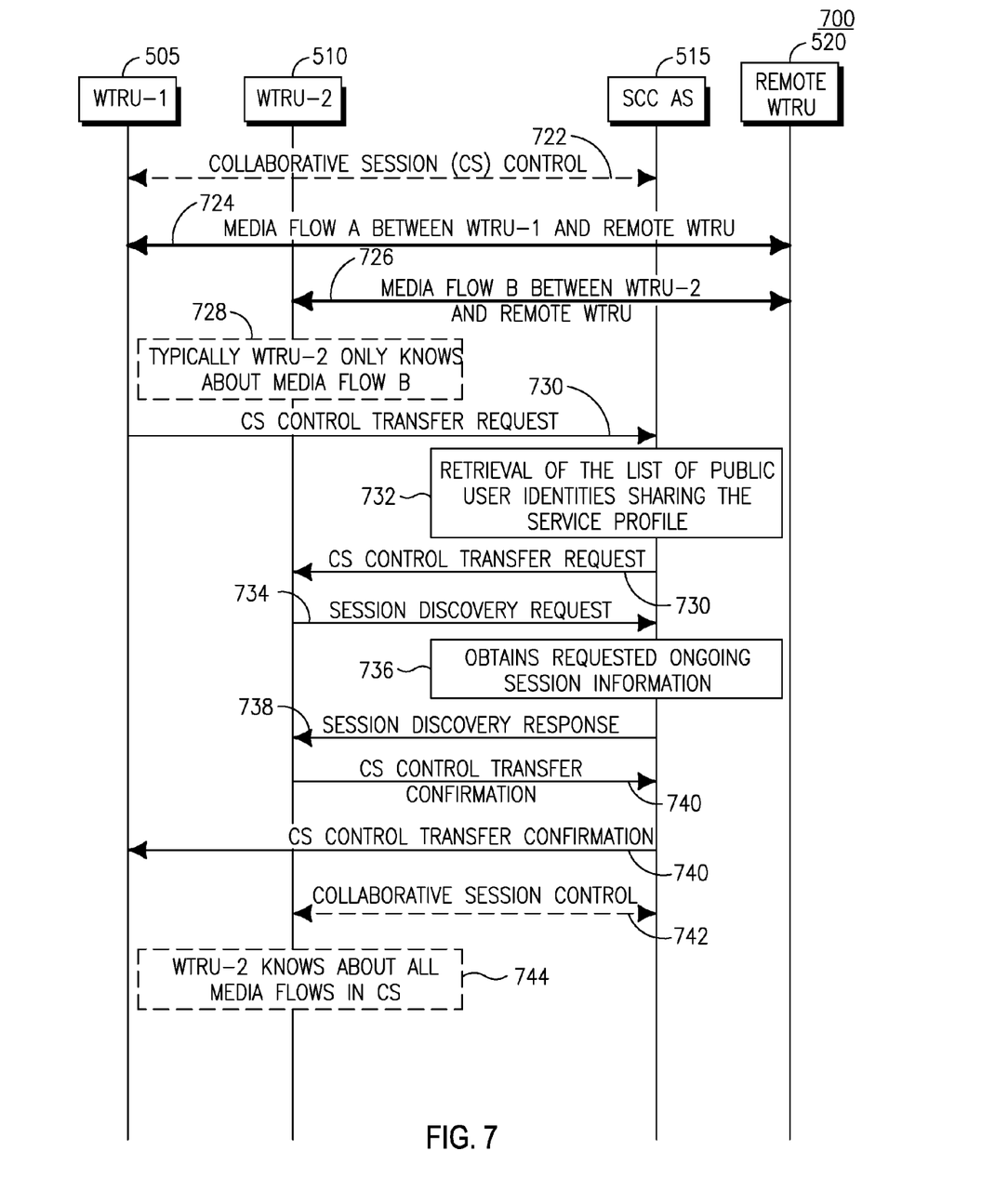
FIG. 7 is a flow diagram of an alternative embodiment of controller initiated transfer of collaborative session control including session discovery information.

FIG. 7 is a flow diagram 700 of an alternative embodiment of controller initiated transfer of collaborative session control including session discovery information. In this embodiment session discovery occurs as part of the collaborative session control transfer procedure. A controller WTRU may transfer control of a collaborative session to another WTRU within the collaborative session. The new controller may be unaware of all media flows and information for the entire collaborative session and may request to obtain session information and media flows for the entire collaborative session prior to accepting collaborative session control.

WTRU-1 505 and WTRU-2 510 may be involved in a collaborative session with a Remote WTRU 520. The controller WTRU, WTRU-1 505, establishes control 722 of the collaborative session via the SCC AS 515. The collaborative session may include multiple media flows and may be anchored at the SCC AS 515. Media flow A 724 may occur between WTRU-1 505 and the Remote WTRU 520. Media flow B 726 may occur between WTRU-2 510 and the Remote WTRU 520. Generally, WTRU-2 510 may only be aware of session information regarding media flow B 728 while WTRU-1 505 is aware of session information and media flows for the entire collaborative session.

WTRU-1 505 may transfer control of the collaborative session by sending a collaborative session control transfer request 730 to the SCC AS 515. The collaborative session control transfer request 730 may include a registered public user identity of WTRU-2 510. The SCC AS 515 may retrieve a list of all of the registered public user identities 732 sharing WTRU-1's 505 public service profile.

The SCC AS 515 determines whether WTRU-2 510 may act as a controller for the collaborative session and that the registered public user identity used by WTRU-2 510 shares the service profile with the public user identity used by WTRU-1 505 for the collaborative session. The SCC AS 515 transfers the collaborative session control transfer request 730 to WTRU-2 510.

WTRU-2 510 transmits a session discovery request 734 to the SCC AS 515 for ongoing session information and media flow information. The SCC AS 515 obtains ongoing session information 736 for the collaborative session. The SCC AS 515 transmits a session discovery response 738 to WTRU-2 510 that includes the ongoing session and media flow information.

WTRU-2 510 transmits a collaborative session control transfer confirmation 740 to WTRU-1 505 via the SCC AS 515. WTRU-2 510 establishes control of the collaborative session 742 via the SCC AS 515. WTRU-2 510 is the controller of the session while WTRU-1 505 is a controlee of the session. WTRU-2 510 is aware of all media flows and session information 744 for the collaborative session.

At any point in the method of FIG. 7, additional actions may be performed between WTRU-1 505, WTRU-2 510, the SCC AS 515 and the Remote WTRU 520.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A Service Centralization and Continuity Application Server (SCC AS) for inter-user equipment (UE) transfer (IUT) of collaborative session control, the SCC AS comprising:
   a receiver configured to receive, from a first UE, a collaborative session control transfer request message associated with a first collaborative session;
   a processor configured to generate session information associated with the first collaborative session, the session information at least including a list of public user identities that share the service profile with the public user identity used by the first UE; and
   a transmitter configured to transmit to a second UE, on a condition that the second UE shares the service profile with the public user identity used by the first UE, the collaborative session control transfer request message that includes the session information associated with the first collaborative session;
   wherein the receiver is further configured to receive, from the second UE, a collaborative session control transfer response message.

2. The SCC AS of claim 1, wherein the collaborative session information includes one or more media flows of the collaborative session.

3. The SCC AS of claim 1, further comprising:
a retrieval device configured to retrieve public user identities for a specified service profile.

4. The SCC AS of claim 1, wherein the collaborative session control transfer request includes an identity of the second UE.

5. The SCC AS of claim 1, wherein transfer of control of the collaborative session occurs.

6. A method for a Service Centralization and Continuity Application Server (SCC AS) for inter-device transfer (IDT) of collaborative session control, the method comprising:
receiving from a first UE, a collaborative session control transfer request message associated with a first collaborative session;
generating session information associated with the first collaborative session, the session information at least including a list of public user identities that share the service profile with the public user identity used by the first UE; and
transmitting to a second UE, on a condition that the second UE shares the service profile with the public user identity used by the first UE, the collaborative session control transfer request message that includes the session information associated with the first collaborative session;
wherein a collaborative session control transfer response message is received from the second UE.

7. The method of claim 6, wherein the session information includes information about one or more media flows of the collaborative session.

8. The method of claim 6, wherein public user identities are retrieved for a specified service profile.

9. The method of claim 6, wherein the collaborative session control transfer request includes an identity of the second UE.

10. The method of claim 6, wherein transfer of control of the collaborative session occurs.

\* \* \* \* \*